No. 855,992. PATENTED JUNE 4, 1907.
E. SKELTON.
NIPPLE ATTACHMENT FOR POINTS.
APPLICATION FILED JAN. 17, 1907.
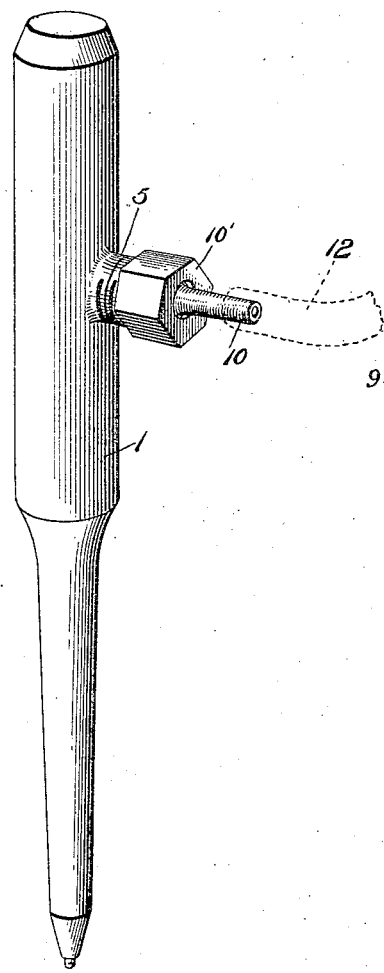
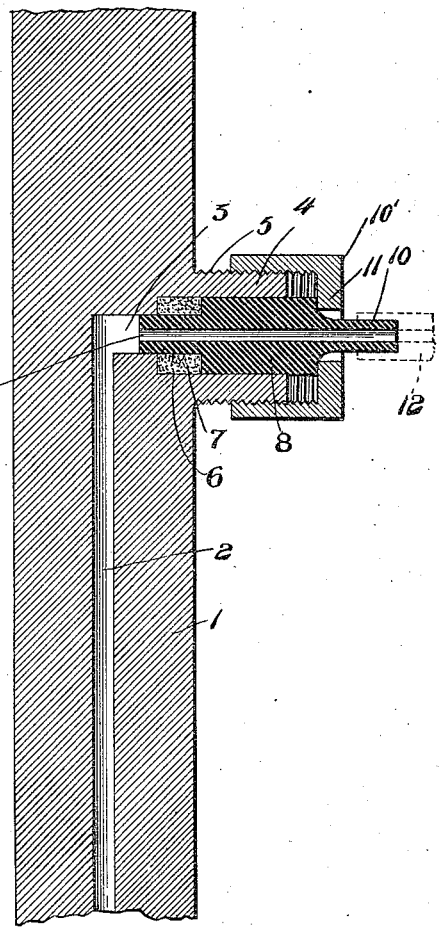

UNITED STATES PATENT OFFICE.

ENOCH SKELTON, OF TACOMA, WASHINGTON.

NIPPLE ATTACHMENT FOR POINTS.

No. 855,992.　　　Specification of Letters Patent.　　　Patented June 4, 1907.

Application filed January 17, 1907. Serial No. 352,842.

*To all whom it may concern:*

Be it known that I, ENOCH SKELTON, a citizen of the United States, residing at Tacoma, in the county of Pierce and State of Washington, have invented certain new and useful Improvements in Nipple Attachments for Points, of which the following is a specification, reference being had therein to the accompanying drawings.

This invention relates to improvements in points, and particularly to a nipple attachment for points.

The object of the invention is the provision of means for facilitating the attaching of a hose or tubing to a point.

Another object of the invention is to construct a point which is provided with a peculiar nipple attachment, whereby the jar on the nipple is relieved when driving the point into the earth or frozen ground.

With these and other objects in view, the invention consists of certain novel constructions, combinations, and arrangements of parts, as will be hereinafter fully described and claimed.

In the drawings: Figure 1 is a perspective view of a point provided with a nipple attachment constructed in accordance with the present invention. Fig. 2 is a fragmentary, vertical sectional view of a point provided with my invention.

Referring to the drawings, 1 designates a point or drill of any ordinary type, which is capable of being used in frozen ground. The point 1 is provided with an ordinary longitudinally-extending passage 2, and with a laterally extending passage 3. A hollow or cylindrical extension 4 is integral with the side of the point 1. This hollow extension 4 is provided with a screw-threaded, outer surface 5, and the inner diameter of said extension is greater than the dimension of the point-passage 3. A stuffing or packing box 6 is formed in the point 1 contiguous to the inner end of the hollow or cylindrical extension 4. This stuffing box or laterally-extending passage 6 is of the same dimensions as the interior of the hollow extension 4. Any suitable stuffing or packing 7 is positioned in the stuffing box 6.

The nipple is preferably formed of Norway iron, or it may be formed of flexible material, and said nipple comprises an enlarged body portion 8 provided with a reduced hollow extension 9 at one end, and upon its opposite end with a reduced, hollow extension 10. The body portion 8 of the nipple is nearly the same dimension as the interior of the hollow extension 4 and stuffing box 6. Upon forcing the body 8 of the nipple into the hollow extension 4, the stuffing or packing 7 will be compressed. The inner end of the body 8 may be forced into the box 6. Through the medium of the packing or stuffing 7 a tight joint is formed between the inner end of the body of the nipple and the point.

The nipple may be of such dimension as to loosely fit the interior of the hollow extension 4, but through the medium of the packing 7 and a removable cap 10', a tight joint is formed.

A cap 10' is internally screw-threaded, and said cap is partly closed at one end, constituting an annular shoulder 11, which shoulder 11 normally abuts against the outer end of the body 8 of the nipple. By screwing the cap 10' upon the hollow extension 4, considerable pressure can be exerted upon the nipple, thereby compressing the packing and slightly compressing the body 8 of the nipple, causing said body to expand sufficiently to form a tight joint between its outer walls and the inner walls of the hollow extension 4. Upon removing the cap 10', the nipple can be quickly detached or removed off of the point 1. It is to be noted that it is essential to form the extension 9 smaller than the body 8, so as said extension can extend through the box 6 into the drill-passage 3. It is also essential that the extension 10 be of less dimension, because, by this structure, a shoulder or an abutting end is formed upon the body 8, which end is engaged by the annular shoulder 11 of the cap 10'. A hose or tubing 12, shown in dotted lines, is preferably secured, by any suitable means, to the end of the extension 10, projecting through the partly-closed end of the cap 10'.

My improved nipple has sufficient play, owing to its structure, to prevent the same from being broken off of the point, as said point is being driven into the frozen earth. I have provided a yielding or flexible attachment for securing one end of a hose or tubing to a drill.

What I claim is:

1. In a device of the character described, the combination with a point and a hose, of a nipple formed of yieldable material connecting said hose to said point.

2. In a device of the character described, the combination with a point, of a removable nipple formed of yieldable material carried by said point, and means for normally securing said nipple to said point.

3. In a device of the character described, the combination with a point, of a removable nipple formed of yieldable material positioned in said point, and removable locking means for fastening said nipple upon said point.

4. In a device of the character described, the combination with a point, of a nipple formed of yieldable material positioned in a portion of said point, and means for compressing said nipple in said point whereby a tight-joint is formed by and between said point and nipple.

5. In a device of the character described, the combination of a point provided with a longitudinally-extending passage and with a laterally-extending passage communicating with said longitudinally-extending passage, an extension integral with said point and the inner diameter of said extension greater than the dimension of the laterally-extending passage of the point, said point provided with a passage of the same dimension as the inner diameter of said extension and said last-mentioned passage connecting said laterally-extending passage of the point and the interior of said extension and a nipple positioned within said extension, laterally-extending passages of said point, said extension screw-threaded upon its outer face, and a revoluble cap screw-threaded upon its inner face and provided with a partly closed end having a central opening, said cap threaded upon the said extension and capable of compressing said nipple for forming a tight-joint between the sides of the nipple and the extension.

6. In a device of the character described, the combination of a point provided with a longitudinally-extending passage and with laterally-extending passages of different dimensions, an extension secured to the side of said point and its interior opening upon said laterally-extending passages of said point, said extension provided with screw-threads upon its outer surface, a nipple formed of yieldable material and provided with a comparatively large body portion and with a reduced extension formed upon its outer end, positioned within said first-mentioned extension, the outer end of the enlarged body portion extending beyond the outer end of said first-mentioned extension, a cap provided with a partly closed outer end threaded upon said extension, the extension of said nipple extending through the outer end of said cap and the partly closed end of said cap engaging directly the outer end of the enlarged body portion of said nipple.

7. In a device of the character described, the combination of a point provided with an integral, lateral extension, a revoluble cap provided with a partly closed end and a central aperture, detachably mounted upon said extension and surrounding a portion of the same, and a nipple formed of yieldable material and provided with an enlarged body portion and an outer reduced extension, the enlarged body portion partly positioned within said first-mentioned extension and partly projecting beyond the outer end of said extension, the extension of said nipple extending through the aperture of said cap, and the partly closed end of said cap engaging directly the enlarged body portion of said nipple, whereby when said cap is adjusted upon said first-mentioned extension toward the point, said enlarged body portion of the nipple will be compressed within said extension.

8. As a new article of manufacture, a point provided with a lateral extension, said extension provided with a screw-threaded outer surface, a cap provided with a partly closed outer end and with an aperture formed in said end, said cap threaded upon the extension, a nipple formed of yieldable material and provided with an enlarged body portion and with an extension extending through the aperture of the outer end of said cap, said cap adapted to engage directly the enlarged body portion of said nipple for retaining said nipple within said extension and compressing said nipple for forming a tight-joint between the sides of the nipple and said extension.

9. In a device of the character described, the combination of a point provided with a longitudinally-extending passage, said point provided with a laterally-extending extension, a cap provided with a partly closed outer end, positioned upon said extension, a nipple formed of yieldable material positioned within said extension, said nipple provided with an enlarged body portion and an outer, reduced extension, engaging said cap, the enlarged body portion engaging said cap and the reduced extension extending through and spaced from the partly closed end of said cap, the extension of said nipple projecting beyond the outer face of said cap, whereby a hose may be attached to the outer end of said extension without engaging said cap.

In testimony whereof I hereunto affix my signature in presence of two witnesses.

ENOCH SKELTON.

Witnesses:
 A. A. KNIGHT,
 CLYDE A. BELL.